Feb. 28, 1939.  L. E. WILLARD  2,149,129
SHOCK ABSORBER
Filed March 23, 1938   2 Sheets-Sheet 2

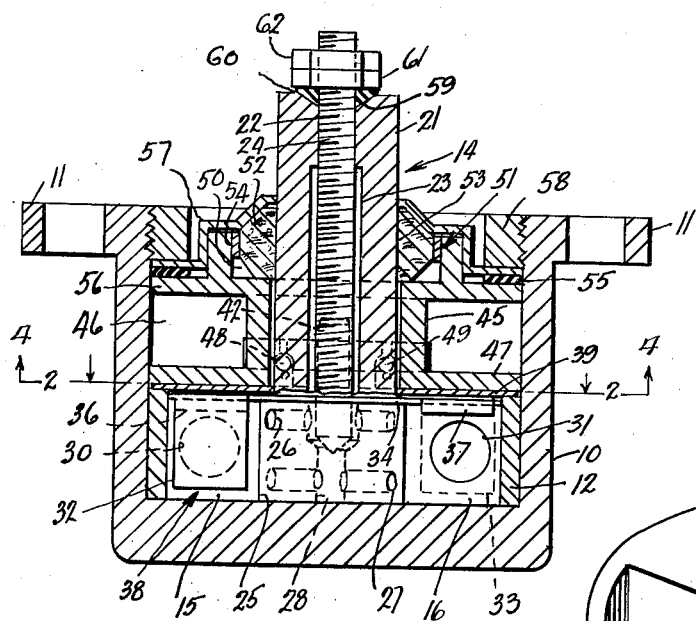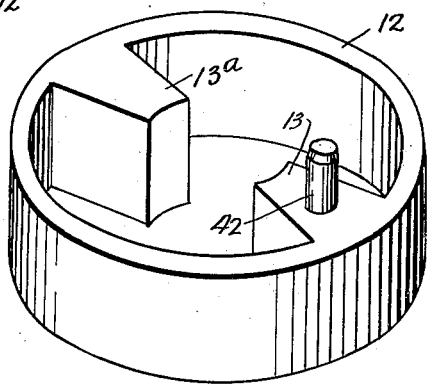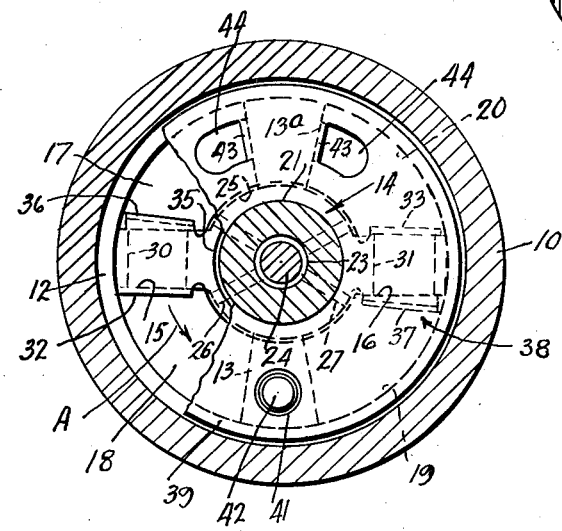

INVENTOR.
Louis E. Willard
BY Joshua E. Davidson
ATTORNEY.

Patented Feb. 28, 1939

2,149,129

UNITED STATES PATENT OFFICE 2,149,129

SHOCK ABSORBER

Louis E. Willard, New York, N. Y., assignor to Charles Zimmer, Brooklyn, N. Y.

Application March 23, 1938, Serial No. 197,656

9 Claims. (Cl. 188—89)

This invention relates to shock absorbers and more particularly to shock absorbers of the oscillating piston type commonly used in motor vehicles and comprising broadly a casing secured to the motor vehicle chassis and an oscillating wing piston the shaft of which extends through an opening in the chassis and is connected to the vehicle axle by means of a connecting arm.

One object of the invention is the provision of a shock absorber of the character referred to which in addition to the standard shock absorber parts, comprises a special construction which will add to the life of the shock absorber and will facilitate the rebuilding of same as well as the shock absorbers now already on the market.

A further object of the invention is the provision of such a shock absorber in which certain parts thereof are so constructed as to provide a favorable valve ratio, so as to permit the use of high viscosity fluid compensating to a large degree for leaks in worn parts, thus increasing the efficiency and useful or working life of the shock absorber.

By favorable valve ratio is meant, a ratio between the throttle valve action in the stem and the check valves in the wings which is great enough to take care of all leakage arising due to wear of the various parts.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a vertical sectional view partly in elevation of a shock absorber constructed in accordance with my invention;

Figure 2 is a cross sectional view thereof taken on line 2—2 Figure 1;

Figure 3 is a perspective view of the divided piston chamber;

Figure 4:
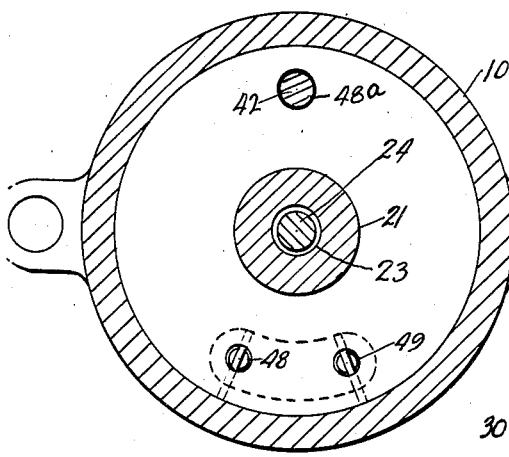
Figure 4 is a cross sectional view through the shock absorber taken at the line 4—4 of Figure 1.
Figure 5:
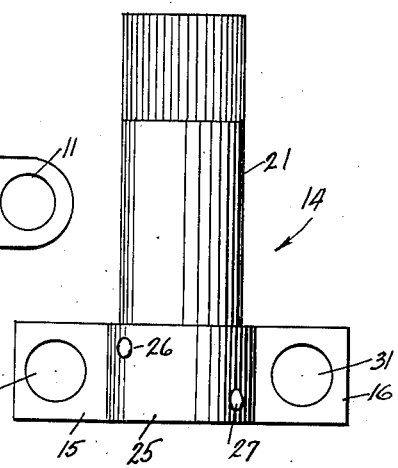
Figure 5 is a side view in elevation of the oscillating wing piston.
Figure 6:
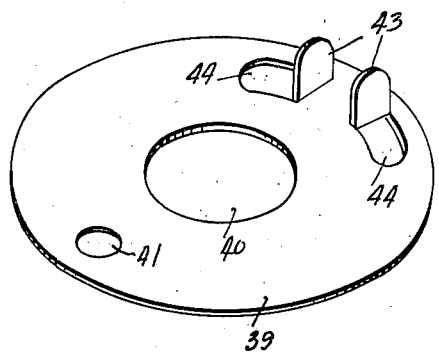
Figure 6 is a perspective view of the special plate lining the bottom surface of the reservoir chamber.
Figure 8:
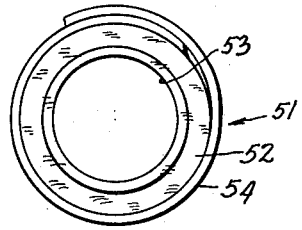
Figure 8 is a top plan view of the self-adjusting take-up gasket for preventing leakage of the device between the piston stem and reservoir wall.
Figures 7, 9:
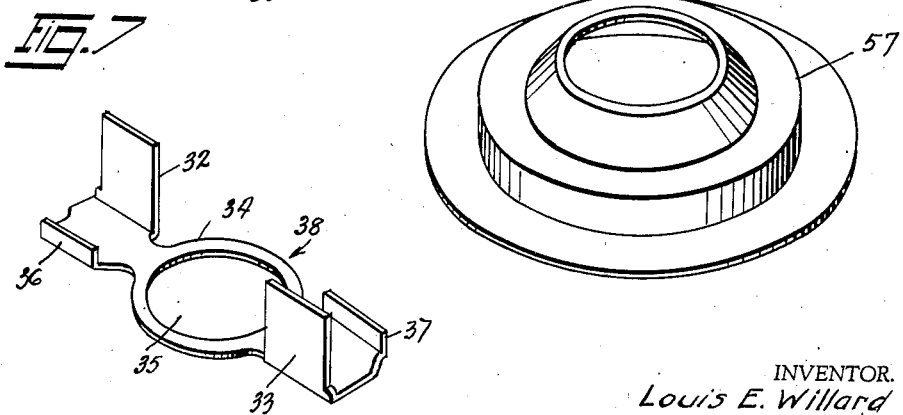
Figure 7 is a perspective view of the piston check valve closure means.
Figure 9 is a perspective view of the cover or gasket retainer.

All shock absorbers receive their braking action by the resistance of fluid being driven through small openings, the higher the viscosity the greater the resistance. Inasmuch as such resistance is largely built up on the upthrow of the car body to check the force of the said upthrow, and in view of the fact that the downthrow of the car should be cushioned, it is essential that the difference between the amount of fluid passing through the throttle valve and that flowing through the check valve when open is sufficiently large even under normal conditions when the shock absorber is new, to effect said cushioning action, for this reason the openings in the check valves must be greatly larger than the opening in the throttle valve. This must of necessity be true in a greater degree when the parts are worn, as due to the wear of the parts the throttling action relative to the check valve action becomes less effective as under such conditions the fluid will by-pass through the leaks caused by such wear. With the check valve openings large enough the proportion of leakage to the amount of fluid passing through the check valves will not materially destroy the favorable checking action of the shock absorber.

Referring now to the drawings in detail, 10 indicates the outer casing of the shock absorber which at one end thereof is provided with a pair of perforated lugs 11 for securing same to the chassis of the motor vehicle or car in connection with which the device is used. Suitably secured to the inner lower portion of the casing 10 is a cylinder or annular ring 12 having a pair of oppositely disposed wings or extensions 13 and 13a which divide the said ring into two compartments.

Oscillatably mounted in the cylinder 12 is a piston having a pair of blades or wings 15 and 16 which divide each of the cylinder compartments into two chambers, thus dividing the entire ring or cylinder into four compartments designated in Figure 2 as 17, 18, 19 and 20 respectively.

The piston 14 is provided at the center thereof with a spindle or shaft portion 21 provided with a central longitudinal bore the upper portion 22 thereof being relatively short and threaded while the lower portion 23 is of larger diameter and unthreaded. Adjustably maintained in the thread opening portion 22 is a threaded valve stem 24 which extends downwardly through the enlarged opening or bore 23 into the base 25 of the piston. The said base 25 is provided with an upper port hole 26 which connects the chambers 18 and 20, and is further provided with a lower port hole 27 which connects the chambers 17 and 19. The said ports are interconnected by the opening 23 and an opening 28 (see Fig. 1), below and in line with the opening 23, and are throttled by the bottom of the valve stem 24.

The piston wing 15 is provided with a valve port 30 of comparatively large diameter and the wing 16 with a similar port 31 of the same diameter, the said ports being closed by closure plates 32 and 33 respectively when the piston is moving in counterclockwise direction. The said plates 32 and 33 are bent from a base 34 which is provided with a central opening 35 to permit of oscillatory movement of the said base about the spindle 21. The base 34 is further provided with short depending projections 36 and 37 which act as means for limiting the movement of the said base, the base 34 and plates 32 and 33 forming a yoke valve 38 for controlling the flow of liquid through the ports 30 and 31.

Placed directly above the yoke valve 38 is a plate 39 which is provided with a central opening 40 encircling the lower end of the spindle or shaft portion 21 and with an opening 41 which fits over a dowel pin 42 on the stationary wing 13. The plate 39 is further provided with a pair of ears 43 punched and bent therefrom, the said ears contacting the sides of the stationary wing 13a and providing openings 44 where they are punched from the plate 39. The said plate 39 forms a lining for a reservoir member 45 having a fluid containing chamber 46. The lower flange or wall 47 of the reservoir 45 is provided with a pair of valves 48 and 49 the first in communication with the piston chamber compartment 17 and the other with the piston chamber compartment 20. The said lower wall 47 is provided with an opening 48a (see Fig. 4) through which the dowel pin 42 passes said arrangement forming means for properly locating the valves 48 and 49 with respect to the piston chamber compartments 17 and 20. The ears or lugs 43 and hole 41 and pin 42 act as locating means for the plate 39 to properly position the openings 44 with respect to the valves 48 and 49.

The upper portion of the reservoir member is provided with a stuffing box 50 in which is positioned a self adjusting gasket 51, said gasket comprising a resilient washer 52 having a central bore 53 which fits around the stem 21, the said washer having a normally expanded compression spring 54 which tends to compress the said washer 52 about the spindle as the material defining the opening 53 becomes worn. A gasket 55 is provided on the upper wall 56 of the reservoir chamber, the said gasket 55 preventing leakage from the reservoir chamber 46. A cap or cover 57 seals both the gaskets 52 and 55 and is held in place against the said gaskets by means of a screw threaded ring or gland 58. The spindle 21 is provided at the top thereof with a depression 59 in which is located a sealing gasket 60 which is clamped and held in position by a jam nut 61 which in turn is locked in place by a lock nut 62.

The general construction and operation of my improved shock absorbers is similar to that of the various standard types now on the market with the following differences.

Instead of valving with the usual small check or flapper valves commonly used in such devices, I have provided the wings 15 and 16 of the piston 14 with relatively large port openings 30 which when the piston is moved in the direction of the arrow A (Fig. 2) on the upthrow of the car body, are closed by the valve closure walls 32 and 33, of the yoke valve 38, the said yoke valve being independent of the wings but acting in conjunction with them.

The operation of the check valve is such that the yoke valve closures open and close the valve ports upon oscillation of the wing piston the opening of said ports being accomplished on the down throw of the car body and the closing upon the upthrow of the car body.

The advantages arising from this valve arrangement are numerous. Firstly, the size of the openings provide non-critical valves which will not clog and will always permit a constant uniform flow of fluid from one side of the compression chambers to the other. Secondly, the large valve openings permit the use of a heavy viscous fluid which will to a great extent compensate for the wear of the various parts and will stand up a great deal longer and will not become disintegrated. Thirdly, due to the use of my improved movable yoked valve closure, there is no bending stress on the closure plates which is present when the flapper valve plates are directly secured to the wings, such stress tending to snap or break off the flapper valves. Fourthly, due to the above arrangement the piston may be used both in right and left hand devices, while with the old arrangement separate right and left hand assemblies of piston and valve arrangement must be provided.

By the introduction of the lining plate 39, the wear between the top surface of piston wings and reservoir chamber bottom surface is eliminated, such wear being taken up by the inexpensive replaceable lining plate, thus saving one of the most expensive parts of the device.

A further advantage of my improved construction is the self-adjustability of the gasket 52 which will at all times be pressed against the circumference of the piston spindle 21 by the spring 43 and hug same tightly to provide a leak-proof joint, the said gasket being held in place by the cover 57 which also holds the reservoir gasket in place.

The introduction of the cored out or enlarged central piston opening 23, permits the use of a simple full length threaded valve stem, without threading the entire length of the opening, the said stem being held in place by the simple means of a jam and a lock nut.

From the foregoing, it will be seen that I have provided a simple and efficient shock absorber which will have a long life.

It will further be seen that the disclosure of the present application may be followed in the rebuilding of the existing shock absorbers that have become worn, as it is but a simple operation to drill the enlarged valve ports 30 and 31 and to insert the other parts as the said parts are made to fit all standard types of shock absorbers.

Having described my invention what I claim as new and desire to secure by Letters Patent is:

1. In a fluid shock absorber, a casing providing a working chamber, radially spaced apart fixed wings therein, an oscillatory piston in the said chamber, wings on the said piston which together with the chamber wings subdivide the chamber into compartments, the said piston wings having check valve openings, a yoke oscillatably mounted on the said piston, and plates carried by the said yoke to close the valve openings when the piston is moved in one direction and to open same when the said piston is moved in the opposite direction.

2. In a fluid shock absorber, a casing providing a working chamber, radially spaced apart fixed wings therein, an oscillatory piston in the said chamber, wings on the said piston which together with the chamber wings subdivide the chamber into compartments, the said piston having valve openings for connecting oppositely disposed chambers, the piston wings having check valve openings of considerably larger diameter than the first mentioned valve openings, a yoke oscillatably mounted on the said piston, and plates carried by the said yoke to close the check valve openings when the piston is moved in one direction and to open same when the said piston is moved in the opposite direction.

3. In combination with an oscillatable shock absorber piston having a pair of wings provided with valve openings, a yoke movably mounted on the said piston, and valve opening closure plates carried by the said yoke.

4. For use in a hydraulic shock absorber, an oscillatory piston comprising a spindle, having a central longitudinal bore, an adjustable valve extending through the said bore, a pair of transverse valve openings of small diameter in the said spindle in communication with the central bore, a pair of radial wings at the bottom of the spindle, said wings being provided with a pair of comparatively large valve openings, one in each wing, a yoke movably mounted on the said spindle, and valve opening closure plates carried by the said yoke as and for the purpose specified.

5. In combination with an oscillatable shock absorber piston having a pair of wings provided with valve openings, a yoke movably mounted on the said piston, a valve opening closure plate carried at each end of the yoke and disposed on opposite sides thereof, and a stop projection opposite each of the said plates.

6. In a fluid shock absorber, a casing providing a working chamber, radially spaced apart fixed wings therein, an oscillatory piston in the said chamber, wings on the said piston which together with the chamber wings subdivide the chamber into compartments, a reservoir casing mounted on the piston above the working chamber, valves in the said reservoir casing leading to some of the chamber compartments, a plate mounted on the piston intermediate the bottom surface of the reservoir casing and the top of the working chamber, the said plate being provided with a pair of openings in alinement with the casing valves, and a pair of lugs on the said plate for engagement with one of the fixed wings in the working chamber to maintain the plate openings in alinement with the valves in the reservoir casing.

7. In a fluid shock absorber, a casing providing a working chamber, radially spaced apart fixed wings therein, an oscillatory piston in the said chamber, wings on the said piston which together with the chamber wings subdivide the chamber into compartments, a reservoir casing mounted on the piston above the working chamber, valves in the said reservoir casing leading to some of the chamber compartments, a plate mounted on the piston intermediate the bottom surface of the reservoir casing and the top of the working chamber, the said plate being provided with a pair of openings in alinement with the casing valves, a pair of lugs on the said plate for engagement with one of the fixed wings in the working chamber to maintain the plate openings in alinement with the valves in the reservoir casing, and a pin extending from the other of said fixed wings passing through the plate and reservoir casing to prevent relative axial movement between the reservoir chamber casing, plate and working chamber.

8. In a fluid shock absorber, a casing providing a working chamber, radially spaced apart fixed wings therein, an oscillatory piston in the said chamber, wings on the said piston which together with the chamber wings subdivide the chamber into compartments, a reservoir casing mounted on the piston above the working chamber, valves in the said reservoir casing leading to some of the chamber compartments, a plate mounted on the piston intermediate the bottom surface of the reservoir casing and the top of the working chamber, the said plate being provided with a pair of openings in alinement with the casing valves, and a pin extending from one of said fixed wings passing through the plate and reservoir casing to prevent relative axial movement between the reservoir chamber casing, plate and working chamber.

9. In a fluid shock absorber, a casing providing a working chamber, radially spaced apart fixed wings therein, an oscillatory piston in the said chamber, wings on the said piston which together with the chamber wings subdivide the chamber into compartments, the said piston wings being provided with valve openings, a yoke valve for cooperation with the valve openings, oscillatably mounted on the said piston, a stationary reservoir casing mounted on the piston above the working chamber and provided with valves leading to some of the chamber compartments, a plate mounted on the piston intermediate the bottom surface of the reservoir casing and the top of the yoke valve, the said plate being provided with a pair of openings in alinement with the casing valves, and a pair of lugs on the said plate for engagement with one of the fixed wings in the working chamber to maintain the plate openings in alinement with the valves in the reservoir.

LOUIS E. WILLARD.